United States Patent
Endo et al.

(10) Patent No.: US 7,228,275 B1
(45) Date of Patent: Jun. 5, 2007

(54) SPEECH RECOGNITION SYSTEM HAVING MULTIPLE SPEECH RECOGNIZERS

(75) Inventors: Norikazu Endo, Sunnyvale, CA (US); John R. Brookes, Oakland, CA (US); Benjamin K. Reaves, Menlo Park, CA (US); Babak Hodjat, Santa Clara, CA (US); Masahiko Funaki, Ichikawa (JP)

(73) Assignees: Toyota InfoTechnology Center Co., Ltd., Tokyo (JP); iAnywhere Solutions, Inc., Dublin, CA (US)

( * ) Notice: Subject to any disclaimer, the term of this patent is extended or adjusted under 35 U.S.C. 154(b) by 920 days.

(21) Appl. No.: 10/341,873

(22) Filed: Jan. 13, 2003

Related U.S. Application Data (60) Provisional application No. 60/420,096, filed on Oct. 21, 2002.

(51) Int. Cl.
 *G10L 15/26* (2006.01)
(52) U.S. Cl. ............... 704/235; 704/231; 704/240
(58) Field of Classification Search ........... 704/235, 704/255, 256, 240, 231, 251, 260
See application file for complete search history.

(56) References Cited

U.S. PATENT DOCUMENTS

| | | | | |
|---|---|---|---|---|
| 5,625,748 A | * | 4/1997 | McDonough et al. | ....... 704/251 |
| 5,710,866 A | * | 1/1998 | Alleva et al. | ............ 704/256.4 |
| 5,794,190 A | * | 8/1998 | Linggard et al. | ........... 704/232 |
| 5,855,000 A | * | 12/1998 | Waibel et al. | ............... 704/235 |
| 5,991,720 A | * | 11/1999 | Galler et al. | ............. 704/256.5 |
| 5,999,902 A | * | 12/1999 | Scahill et al. | ............... 704/240 |
| 6,122,613 A | * | 9/2000 | Baker | ......................... 704/235 |
| 6,144,989 A | | 11/2000 | Hodjat et al. | |
| 6,526,380 B1 | * | 2/2003 | Thelen et al. | ............... 704/251 |
| 6,567,778 B1 | * | 5/2003 | Chao Chang et al. | ...... 704/257 |
| 6,760,699 B1 | * | 7/2004 | Weerackody et al. | ....... 704/233 |
| 6,836,758 B2 | * | 12/2004 | Bi et al. | ..................... 704/231 |
| 2003/0050777 A1 | * | 3/2003 | Walker, Jr. | .................. 704/235 |
| 2003/0125940 A1 | * | 7/2003 | Basson et al. | .............. 704/231 |

\* cited by examiner

*Primary Examiner*—Vijay Chawan
(74) *Attorney, Agent, or Firm*—Fenwick & West LLP

(57) ABSTRACT

A speech recognition system recognizes an input speech signal by using a first speech recognizer and a second speech recognizer each coupled to a decision module. Each of the first and second speech recognizers outputs first and second recognized speech texts and first and second associated confidence scores, respectively, and the decision module selects either the first or the second speech text depending upon which of the first or second confidence score is higher. The decision module may also adjust the first and second confidence scores to generate first and second adjusted confidence scores, respectively, and select either the first or second speech text depending upon which of the first or second adjusted confidence scores is higher. The first and second confidence scores may be adjusted based upon the location of a speaker, the identity or accent of the speaker, the context of the speech, and the like.

26 Claims, 7 Drawing Sheets

Look-up Table for Speech Selection Parameters

|  | State 1 | State 2 | ...... | State M |
|---|---|---|---|---|
| Speech Recognizer #1 | $p_{11}, q_{11}$ | $p_{12}, q_{12}$ | ...... | $p_{1M}, q_{1M}$ |
| Speech Recognizer #2 | $p_{21}, q_{21}$ | $p_{22}, q_{22}$ | ...... | $p_{2M}, q_{2M}$ |
| . . . | ...... | ...... | ...... | ...... |
| Speech Recognizer #N | $p_{N1}, q_{N1}$ | $p_{N2}, q_{N2}$ | ...... | $p_{NM}, q_{NM}$ |

FIG. 7

SPEECH RECOGNITION SYSTEM HAVING MULTIPLE SPEECH RECOGNIZERS

CROSS-REFERENCE TO RELATED APPLICATION

This application claims priority under 35 U.S.C. §119(e) to now abandoned U.S. Provisional Patent Application No. 60/420,096, entitled "Multiple Speech Recognition for Natural Interaction Interfaces," filed on Oct. 21, 2002, the subject matter of which is incorporated by reference herein in its entirety.

TECHNICAL FIELD

The present invention relates generally to a speech recognition system, and more specifically to a speech recognition system having multiple speech recognizers for recognition of the speech input.

BACKGROUND OF THE INVENTION

Speech recognition systems have received increased attention lately and are becoming popular. Speech recognition technology is being used more and more in a wide range of technology areas ranging from security systems and automated response systems to a variety of electronic devices such as computers.

Speech recognition systems are also used as a command input device for controlling back-end applications such as car navigation systems or home entertainment systems. Accuracy of the speech recognition is very important especially when it is used to control a back-end application, since the user generally will not be given a chance to correct a mis-recognized word before the back-end application proceeds to take the unintended action. If the speech recognition is inaccurate, the speaker will have to re-enter the speech command after the unintended action has been taken by the back-end application.

Conventional speech recognition systems typically attempt to recognize speech by processing the input speech signal using a single speech recognizer. These speech recognizers could be a grammar-based speech recognizer, a statistical speech recognizer, or any other type of speech recognizer known in the art. However, these different types of conventional speech recognizers have their own strengths and weaknesses, and are not capable of accurate recognition over a broad range of speech.

Grammar-based speech recognizers compares templates, defined by specified grammar rules and pronunciation dictionaries, of sequence of words with the input speech signal, and selects the word sequence with the highest confidence level as its output result. These grammar rules are created manually with knowledge of how the user of the speech recognizer would be expected to speak. Grammar-based speech recognizers tend to be more accurate than statistical speech recognizers in speech recognition tasks involving relatively little variability in the way that a user would express himself. However, grammar-based speech recognizers are restrictive but accurate in what they can recognize, since they typically utilize a small number of sequence of words for comparison with the input speech.

Statistical speech recognizers use statistical language models in place of the grammar rules of the grammar-based speech recognizers in comparing the input speech. Statistical language models are created using a corpus of transcribed examples of actual speech. From this corpus, the statistical language models infer the probability of the following word, given the previous word or words. These words may be replaced by any token, such as a start-of-utterance, or by a class such as "Business-Name." Each class is then associated with a list of words and phrases, which may be created manually or automatically created from another corpus. Statistical speech recognizers perform much better than grammar-based recognizers when the variability of the input speech is high or unknown. They are better at recognizing non-grammatical utterances, and to some extent unpredicted speech out of the context. However, the success of the statistical speech recognizers depends on the quality and quantity of data in training the corpus. In addition, statistical speech recognizers typically do not incorporate any understanding of the meaning of the words that they recognize.

Therefore, there is a need for a speech recognition system that takes advantage of the strengths, while complementing the weaknesses, of different types of conventional speech recognizers. There is also a need for a speech recognition system that uses multiple speech recognizers having different strengths and weaknesses. There is also a need for a speech recognition system that can select the most accurate one of the speech recognition results output from the multiple speech recognizers.

SUMMARY OF INVENTION

The present invention provides a speech recognition system that recognizes an input speech signal by using a plurality of speech recognizers each outputting recognized speech texts and associated confidence scores and a decision module selecting one of the speech texts based upon their associated confidence scores. In one embodiment of the present invention, the speech recognition system comprises a first speech recognizer and a second speech recognizer both of which are coupled to a decision module. The first and second speech recognizers are conventional speech recognizers and can be of the same or different type. The first speech recognizer recognizes the input speech signal and generates a first speech text and a first confidence score indicating the level of accuracy of the first speech text. Likewise, the second speech recognizer also recognizes the input speech signal and generates a second speech text and a second confidence score indicating the level of accuracy of the second speech text. The decision module selects either the first speech text or the second speech text as the output speech text depending upon which of the first and second confidence scores is higher.

In another embodiment of the present invention, the decision module adjusts the first confidence score and the second confidence score to generate a first adjusted confidence score and a second adjusted confidence score, respectively, and selects either the first speech text or the second speech text depending upon which of the first or second adjusted confidence scores is higher. In one embodiment of the present invention, the first adjusted confidence score is generated by multiplying a first speech selection parameter with the first confidence score and adding a second speech selection parameter. Likewise, the second adjusted confidence score is generated by multiplying a third speech selection parameter with the second confidence score and adding a fourth speech selection parameter. The first, second, third, and fourth speech selection parameters for adjusting the confidence score are selected by determining the state in which the speech recognition system is placed based upon external data such as the location information of the speaker of the input speech signal, the accent of the speaker, and the identity of the speaker, or control data such as the context of the speech or the state of the dialog.

Because the output speech text is selected from the outputs from a plurality of speech recognizers in the speech recognition system of the present invention, the speech recognition system can take advantage of the strengths, while complementing the weaknesses, of each speech recognizer. In addition, the strengths and weaknesses of each speech recognizer can be emphasized or de-emphasized by using different speech selection parameters for different states in which the speech recognition system is placed or other extrinsic information. The state of the speech recognition system can be determined based upon the external data such as the location information of a speaker of the input speech signal, the accent of the speaker, the identity of the speaker, or the context of the speech. Therefore, the speech recognition system of the present invention can recognize input speech signals much more accurately than conventional speech recognizers and thus can be used to control back-end applications such as car navigation systems or home appliances that require very accurate speech recognition.

BRIEF DESCRIPTION OF THE DRAWINGS

The teachings of the present invention can be readily understood by considering the following detailed description in conjunction with the accompanying drawings.

DETAILED DESCRIPTION OF EMBODIMENTS

The embodiments of the present invention will be described below with reference to the accompanying drawings. Like reference numerals are used for like elements in the accompanying drawings.

Figure 1:
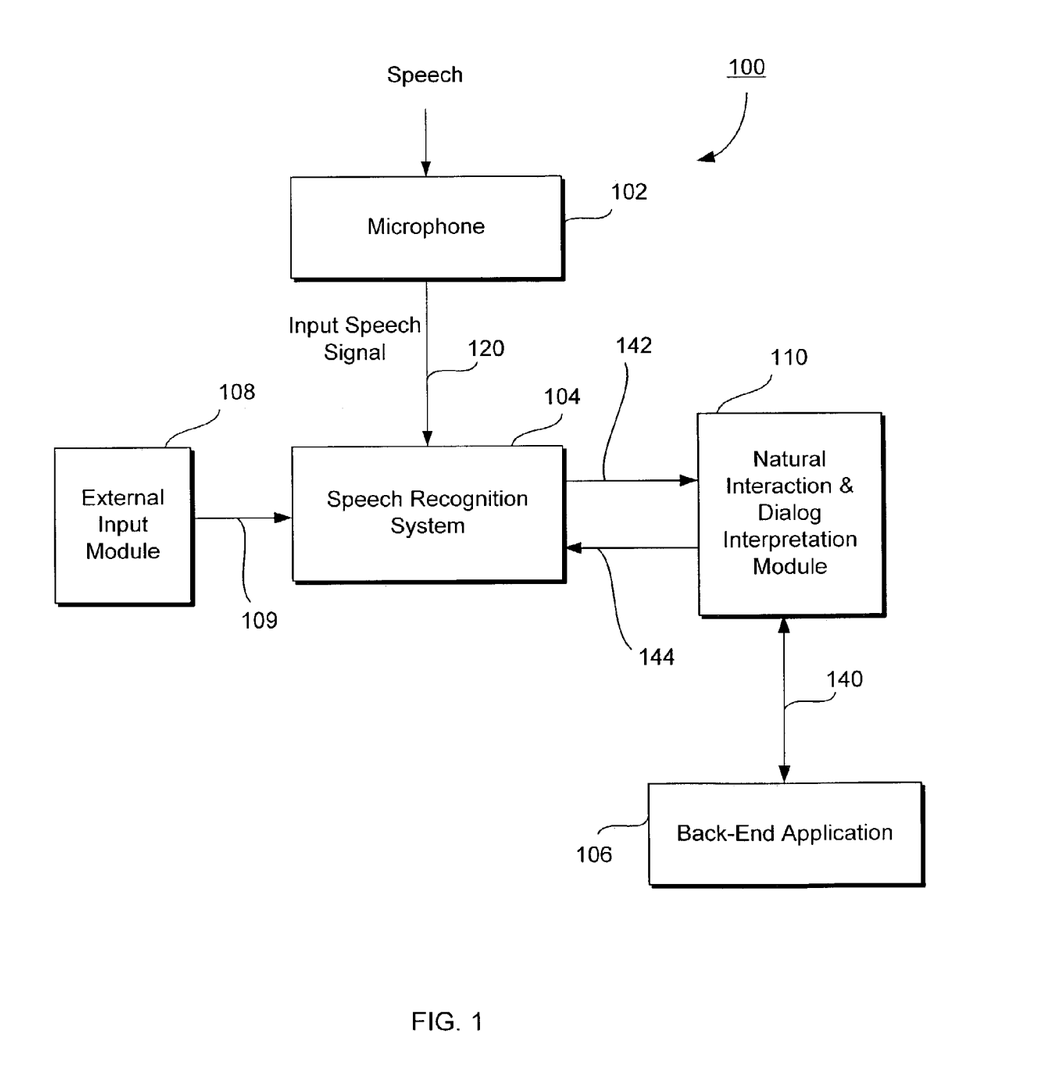
FIG. 1 is a block diagram illustrating a system using a speech recognition system according to one embodiment of the present invention.

FIG. 1 is a block diagram illustrating a system 100 using a speech recognition system 104 according to one embodiment of the present invention. This embodiment of the system 100 preferably includes a microphone 102, a speech recognition system 104, a back-end application 106, an external input module 108, and a natural interaction and dialog interpretation module (hereinafter, "NIDI module") 110. The system 100 uses the speech recognition system 104 as a command input device for controlling the back-end application 106. The back-end application 106 can be any type of device, such as a car navigation system, a car audio, a home entertainment system, an electrical appliance, or the like.

Referring to FIG. 1, the microphone 102 receives speech commands from a user or a speaker (not shown) and converts the speech to an input speech signal on signal lines 120. The microphone 102 passes the input speech signal 120 to the speech recognition system 104. The speech recognition system 104 preferably comprises multiple speech recognizers to recognize the input speech signal 120, according to an embodiment of the present invention. Various embodiments of the speech recognition system 104 will be explained in detail below with reference to FIGS. 2-7.

The speech recognition system 104 is coupled to an external input module 108 that provides external data for biasing the speech recognition system 104. The external input module 108 in one embodiment is a memory device storing external data including the location information of a speaker speaking into the microphone 102, identity or type of accent of the speaker, level of background noise, and the like. These external data may be provided by external devices (not shown) such as a global position system (GPS) device, an external computer storing log-in information of the speaker, a noise detector, and the like. While the external input module 108 is described as a memory device, those skilled in the art will recognize that the external data can be directly input to the speech recognition system 104 from various external sensors or sensing systems. The manner in which the external data biases the speech recognition system 104 will be explained in detail below with reference to FIGS. 5-7.

The NIDI module 110 is coupled to the speech recognition system and may receive the recognized speech from the speech recognition system in the form of speech text 142. The speech text 142 may also be in the form of slot-value pairs, such as <device="television">and <action="on"> meaning, "I want to turn on the television." The NIDI module 110 discerns the meaning of the recognized speech text 142 by spotting concepts in the speech text 142, typically by reference to specific keywords or classes of keywords. Some of the keywords are the concepts themselves (like "Monday" in the phrase, "I'll be there on Monday"), and some of the keywords are indicators of where the concept is likely to appear (like "on" in the same phrase). The NIDI module 110 converts the discerned speech text to corresponding control signals 140 for controlling the back-end application 106. The NIDI module 110 also provides the speech recognition system 104 with control data 144 such as the context of the speech for biasing the speech recognition system 104. The manner in which the control data 144 from the NIDI module 110 are used to bias the speech recognition system 104 will be explained in more detail below with reference to FIGS. 3 and 5-7.

The operations of the NIDI module 110 involved in discerning the meaning of the speech text 142 are well known to one skilled in the art and a detailed description on how such operations are accomplished is not necessary for an understanding of the present invention. An agent network according to the adaptive agent oriented software architecture (AAOSA) described in U.S. Pat. No. 6,144,989 to Hodjat et al. and entitled "Adaptive Agent-Oriented Software Architecture" is an example of a NIDI module 110 that can be used with the system 100 of the present invention. U.S. Pat. No. 6,144,989 is incorporated by reference herein in its entirety. As described in U.S. Pat. No. 6,144,989, an agent network can be developed for the purpose of interpreting speech input as commands and inquiries for the back end application 106. The agent network is a network of agents, each containing "policy conditions" on which the agent bases "claims" to part or all of an incoming token sequence (recognized speech text). The agents also contain "policy actions" which specify all or part of an actuation control signal to be issued to the back end application 106 if the policy's claims turn out to be, or be part of, the best claims.

The back-end application 106 is coupled to the NIDI module 110 to receive the control signals 140 from the NIDI module 110. As such, the back-end application 106 can perform the function intended by the input speech.

Figure 2:
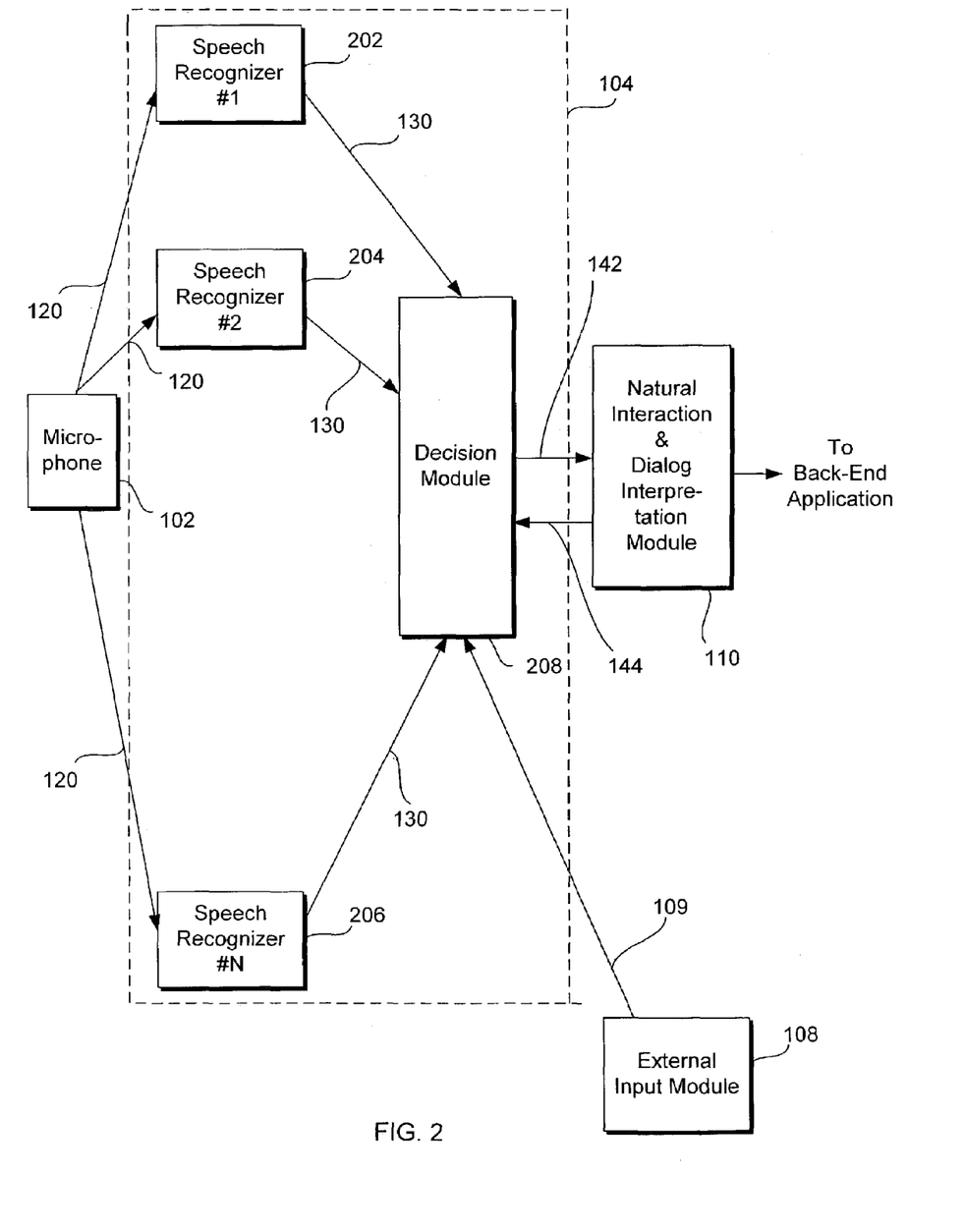
FIG. 2 is a block diagram illustrating portions of a speech recognition system according to one embodiment of the present invention.

FIG. 2 is a block diagram illustrating a speech recognition system 104 according to one embodiment of the present invention. The speech recognition system 104 is shown coupled to the NIDI module 110, the microphone 102, and the external input module 108. The speech recognition system includes N number of speech recognizers including a first speech recognizer 202, a second speech recognizer 204, and an Nth speech recognizer 206, and a decision module 208 coupled to receive recognized speech texts 130 from each of the N speech recognizers #1-#*N*.

The speech recognizers 202, 204, 206 are conventional speech recognizers that are well known in the art and commercially available, except that they provide the recognized speech text and confidence scores to the decision module 208. As such, a detailed explanation of the operations of the speech recognizers 202, 204, 206 is not necessary for an understanding of the present invention. The speech recognizers 202, 204, 206 can be any type of conventional speech recognizer, such as a grammar-based speech recognizer or a statistical speech recognizer. The speech recognizers 202, 204, 206 may be customized to operate well with the present invention. In addition, the speech recognizers 202, 204, 206 may include more than one of the same type of speech recognizers. For example, the speech recognizers 202, 204, 206 may include two grammar-based speech recognizers each using a different set of grammars and one statistical speech recognizer. It should be clear to one skilled in the art that any number of speech recognizers, any number of types of speech recognizers, or any number of same types of speech recognizers may be used in the speech recognition system 104.

Each speech recognizer 202, 204, 206 recognizes the input speech signal 120 output from the microphone 102 according to its own speech recognition mechanism (whether it is a grammar-based speech recognizer or a statistical speech recognizer) and outputs the recognized speech text 130 along with an associated raw confidence score 130 (also referred to as "confidence level," "likelihood score," "probability score," or the like) to the decision module 208. For example, one speech recognizer 202 may output its speech recognition result as "I want to turn on the television" with a confidence score of 70. In another embodiment, the speech recognizers 202, 204, 206 may output their results in the form of slot-value pairs. For example, one speech recognizer 204 may output its speech recognition result as slot-value pairs, such as <device="television": confidence score=80>and <action="on": confidence score=60>. In the context of the speech recognition results output from the speech recognizers used in the speech recognition system of the present invention, the term "speech text" includes speech recognition results in the form of slot-value pairs. In one embodiment, the raw confidence scores output from the speech recognizers 202, 204, 206 are already normalized by the speech recognizers 202, 204, 206 to a common range prior to output to the decision module 208, so that a meaningful comparison of the raw confidence scores output from the speech recognizers 202, 204, 206 can be performed in the decision module 208. However, it should be clear to one skilled in the art that the normalization of the raw confidence scores may be carried out in the decision module 208 as well. In one embodiment of the present invention, each of the speech recognizers 202, 204, 206 outputs a confidence score that is normalized to a range of 0-100. It should be clear to one skilled in the art that any range of confidence scores may be used within the scope of the present invention. The speech recognizers 202, 204, 206 can run in parallel or sequentially.

The decision module 208 is coupled to receive the recognized speech text 130 and the associated raw confidence scores 130 from the speech recognizers 202, 204, 206. The decision module 208 determines the most accurate one of the recognized speech texts according to the methods of the present invention.

In the simplest embodiment of the present invention, the decision module 208 selects the speech text with the highest raw confidence score and outputs it to the NIDI module 110 for conversion to a control signal for controlling the back-end application 106. In case all the raw confidence scores are below a predetermined or a dynamically determined threshold score (e.g., 40), the decision module 208 rejects all of the recognized speech text, since none of the recognized speech texts are reliable. The decision module 208 defaults to the recognized speech text of a predetermined speech recognizer if all the raw confidence scores are same. A predetermined default priority may be assigned to the speech recognizers 202, 204, 206 such that the decision module 208 defaults to the recognized speech text of one of the speech recognizers 202, 204, 206 according to the default priority.

In another embodiment of the present invention, the decision module 208 adjusts the raw confidence scores to generate adjusted confidence scores associated with the recognized speech text, based upon the control data 144 (e.g., context of the speech) provided by the NIDI module 110 and the external data 109 (e.g., identity or type of accent of the speaker, level of background noise, location information of a speaker, and the like) provided by the external input module 108. The adjustment of the raw confidence scores may be driven by only a single factor (one of the external data 109 or control data 144) or by a combination of the factors (the combination of two or more of the external data 109 or control data 144). The manner in which the external data 109 and the control data 144 are used to generate the adjusted confidence scores will be explained in detail below with reference to FIGS. 5-7. The decision module 208 selects the speech text with the highest adjusted confidence score as the most accurate recognized speech text and outputs it to the NIDI module 110 for conversion to a control signal for controlling the back-end application 106. In case all the adjusted confidence scores are below a predetermined or a dynamically determined threshold score (e.g., 60), the decision module 208 rejects all of the recognized speech text, since none of the recognized speech texts are reliable. The decision module 208 also defaults to the recognized speech text of a predetermined speech recognizer if all the adjusted confidence scores are same and the external data 109 or control data 144 gives no indication of a preference.

The NIDI module 110 in FIG. 2 is shown coupled to the decision module 208. However, in another embodiment, the NIDI module 110 may also be coupled directly to the speech recognizers 202, 204, 206 to directly receive the speech text 130 output from the speech recognizers 202, 204, 206. In such embodiment, the NIDI module 110 may discern the meaning of the speech text 130 output from the speech recognizers 202, 204, 206 in real time and provide the context of the current input speech as control data 144 to the decision module 208 to bias the decision module 208.

Figure 3:
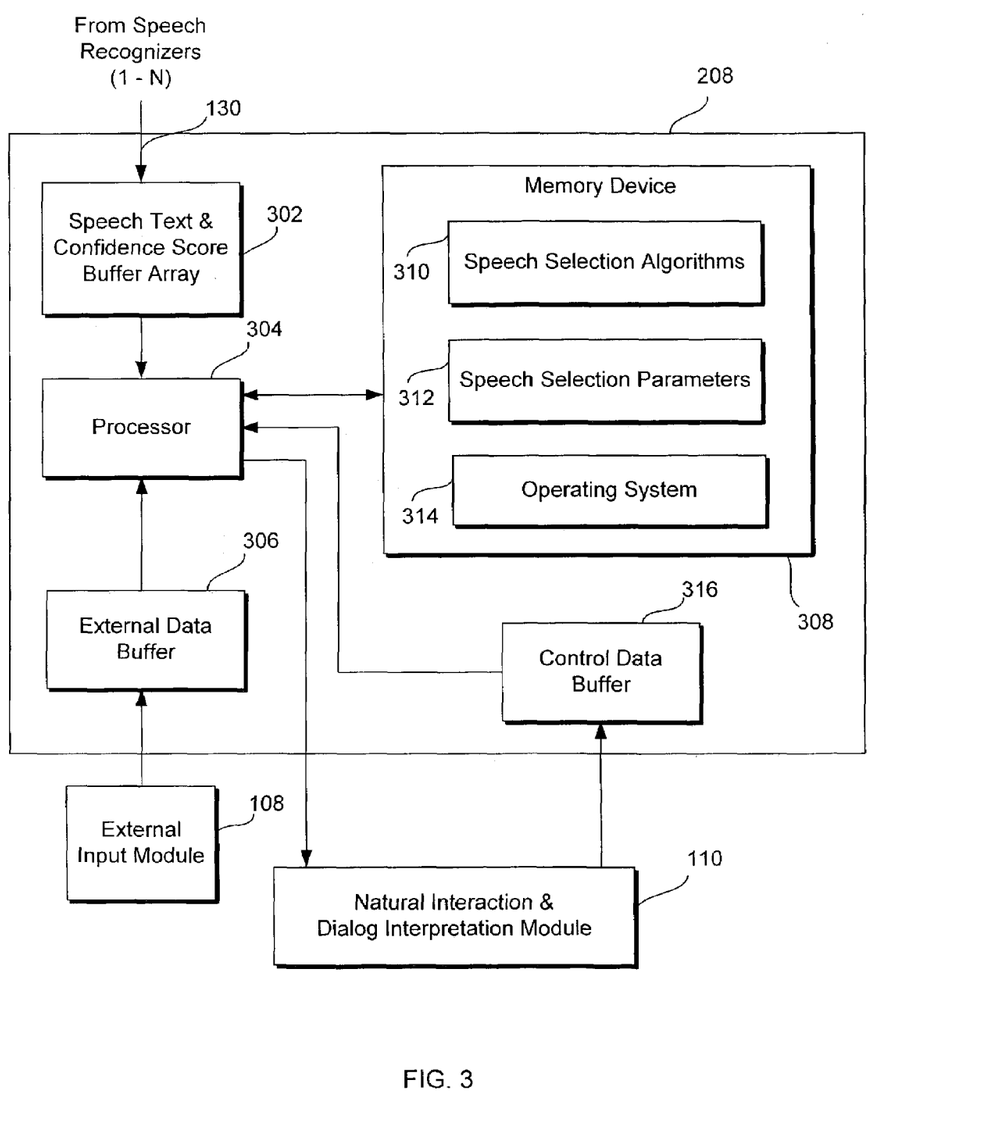
FIG. 3 is a block diagram illustrating a decision module used in the speech system according to one embodiment of the present invention.

FIG. 3 is a block diagram illustrating the decision module 208 used in the speech recognition system 104 according to one embodiment of the present invention. The decision module 208 is coupled to the speech recognizers 202, 204, 206, the external input module 108, and the NIDI module 110. The decision module 208 includes a speech text and confidence score buffer array 302, a processor 304, an external data buffer 306, a memory device 308, and a control data buffer 316.

The speech text and confidence score buffer array 302 is a memory, and receives and temporarily stores the recognized speech text and associated raw confidence scores while the decision module 208 selects the most accurate speech text according to the method of the present invention. The speech text and confidence score buffer array 302 is coupled to the processor 304 to provide the recognized speech texts and the associated raw confidence scores to the processor 304 for use in adjustment of the raw confidence scores and selection of the most accurate recognized speech text.

The external data buffer 306 is also a memory device temporarily storing the external data such as the location information of the speaker, identity or type of accent of the speaker, level of background noise, and the like provided by the external input module 108 while the decision module 208 selects the most accurate speech text according to the method of the present invention. The external data buffer 306 is coupled to the processor 304 to provide the external data to the processor 304 for use in adjustment of the raw confidence scores and selection of the most accurate recognized speech text.

The control data buffer 316 is also a memory device temporarily storing the control data such as the context of the speech provided by the NIDI module 110 while the decision module 208 selects the most accurate speech text according to the present invention. The control data buffer 316 is coupled to the processor 304 to provide the control data to the processor 304 for use in adjustment of the raw confidence scores and selection of the most accurate recognized speech text.

The memory device 308 includes speech selection algorithms 310, speech selection parameters 312, and an operating system. The speech selection algorithms 310 include the algorithms as described in FIGS. 4-6 and are used in adjustment of the raw confidence scores and selection of the most accurate recognized speech text. The speech selection parameters 312 include the parameters such as those described in FIG. 7, and are used for adjustment of the raw confidence scores based upon the external data and the control data. The operating system 314 includes boot-up sequences and instructions sets for operating the decision module 208.

The processor 304 is coupled to the memory 308 so that it can be operated by the operating system 314 and so that it can use the speech selection algorithms 310 and the speech selection parameters in adjusting the raw confidence scores and determining the most accurate speech text. The processor 304 may be any type of commercially available microprocessor or customized microprocessor that are typically used in computer systems. The processor 304 receives the recognized speech texts and the associated raw confidence scores from the speech recognizers 202, 204, 206, and operates to determine the most accurate one of the recognized speech texts according to the speech selection algorithms 310. The processor 304 may also use the external data in the external data buffer 306 and the control data 316 in the control data buffer 316 to select certain ones of the speech selection parameters 314 and generate adjusted confidence scores to determine the most accurate one of the recognized speech texts according to the speech selection algorithms 310 and based upon the adjusted confidence scores.

In the embodiment shown in FIG. 3, most of the intelligence involved in selecting one of the recognized speech text resides in the decision module 208. However, the present invention may be modified such that such intelligence resides in the NIDI module 110 while the decision module 208 merely selects one of the recognized speech text according to instructions from the NIDI module 110. Furthermore, the present invention may also be modified such that the decision module 208 and the NIDI module 110 share such intelligence.

Figure 4:
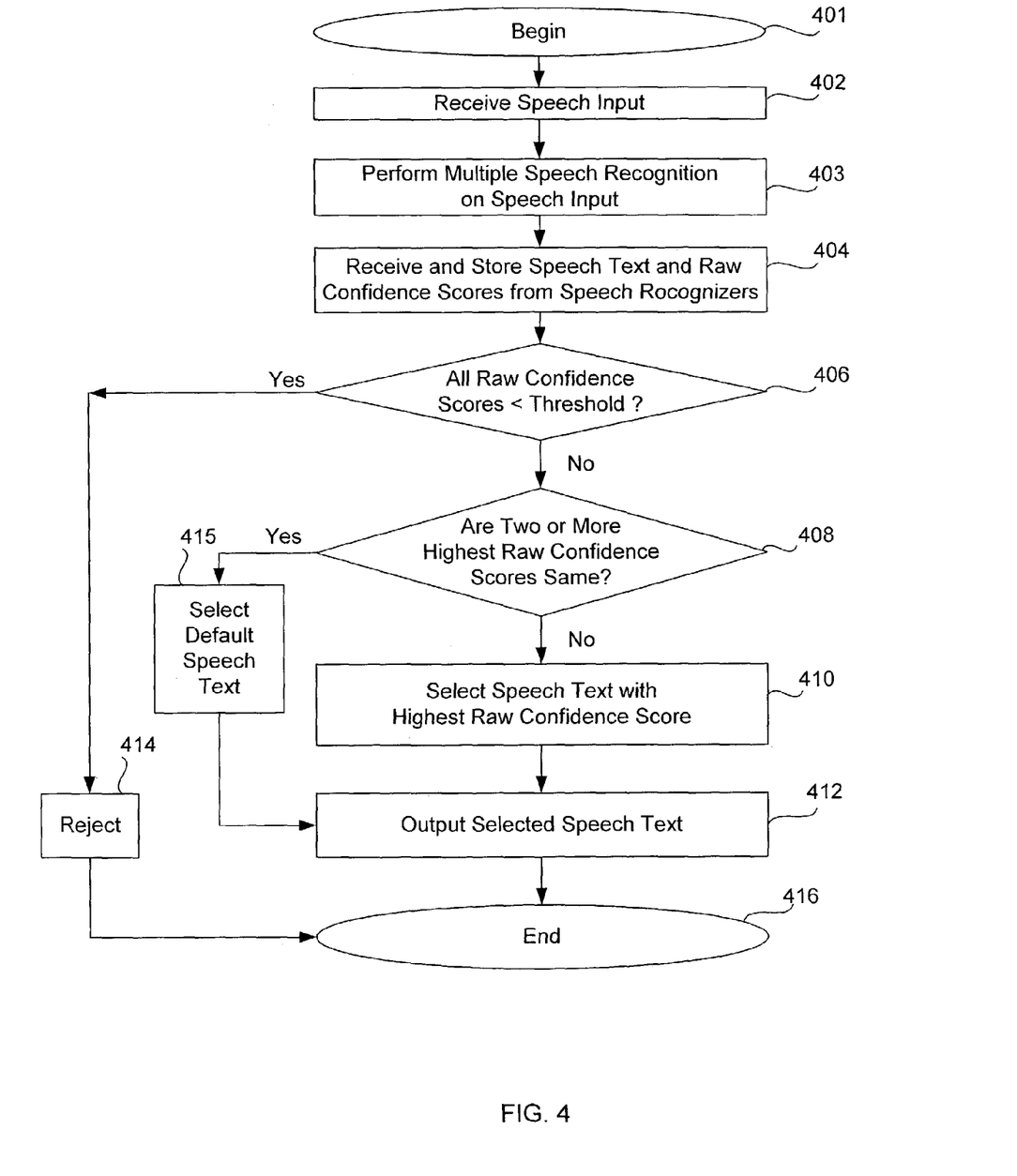
FIG. 4 is flowchart illustrating the speech recognition method using multiple speech recognizers according to a first embodiment of the present invention.

FIG. 4 is flowchart illustrating the speech recognition method using multiple speech recognizers according to a first embodiment of the present invention. The method of FIG. 4 selects the recognized speech text with the highest raw confidence score as the speech recognition result. The method of FIG. 4 is performed by the decision module 208.

Referring to FIG. 4, the method begins 401 by receiving 402 a speech input and performing 403 multiple speech recognition on the speech input by using multiple speech recognizers. Then, the method receives and stores 404 the recognized speech texts and associated raw confidence scores from the multiple speech recognizers. If all the raw confidence scores are less then a predetermined threshold 406, then all the recognized speech texts are rejected 414 as being unreliable. If two or more of the highest raw confidence scores are the same 408, one of the recognized speech texts with the same highest confidence scores is selected 415 as the default result. The default result may be predetermined according to a default priority among the multiple speech recognizers. For example, the method may select the speech text output from a particular type of speech recognizer (e.g., grammar-based speech recognizer or statistical type speech recognizer) as the default result. When all the raw confidence scores are not less than the threshold and two or more of the highest raw confidence scores are not the same, the method selects 410 the recognized speech text with the highest raw confidence scores and outputs 412 the selected speech text as the speech recognition result, and the process ends 416.

EXAMPLE 1

Consider the example of the speech recognition system of the present invention attempting to recognize the input speech "Ten University Avenue, Palo Alto" using two grammar-based speech recognizers and a statistical speech recognizer. The first grammar-based speech recognizer may recognize the input speech as "Ten University Avenue, Palo Alto" with a confidence score of 66. The second grammar-based speech recognizer may recognize the input speech as "Ten University Avenue, Palo Cedro" with a confidence score of 61. The statistical speech recognizer may recognize the input speech as "When University Avenue, Palo Alto" with a confidence score of 60. According to the embodiment described in FIG. 4, the speech recognition system will select the speech recognition result "Ten University Avenue Palo Alto" from the first grammar-based speech recognizer, since it has the highest confidence score (66).

Figure 5:
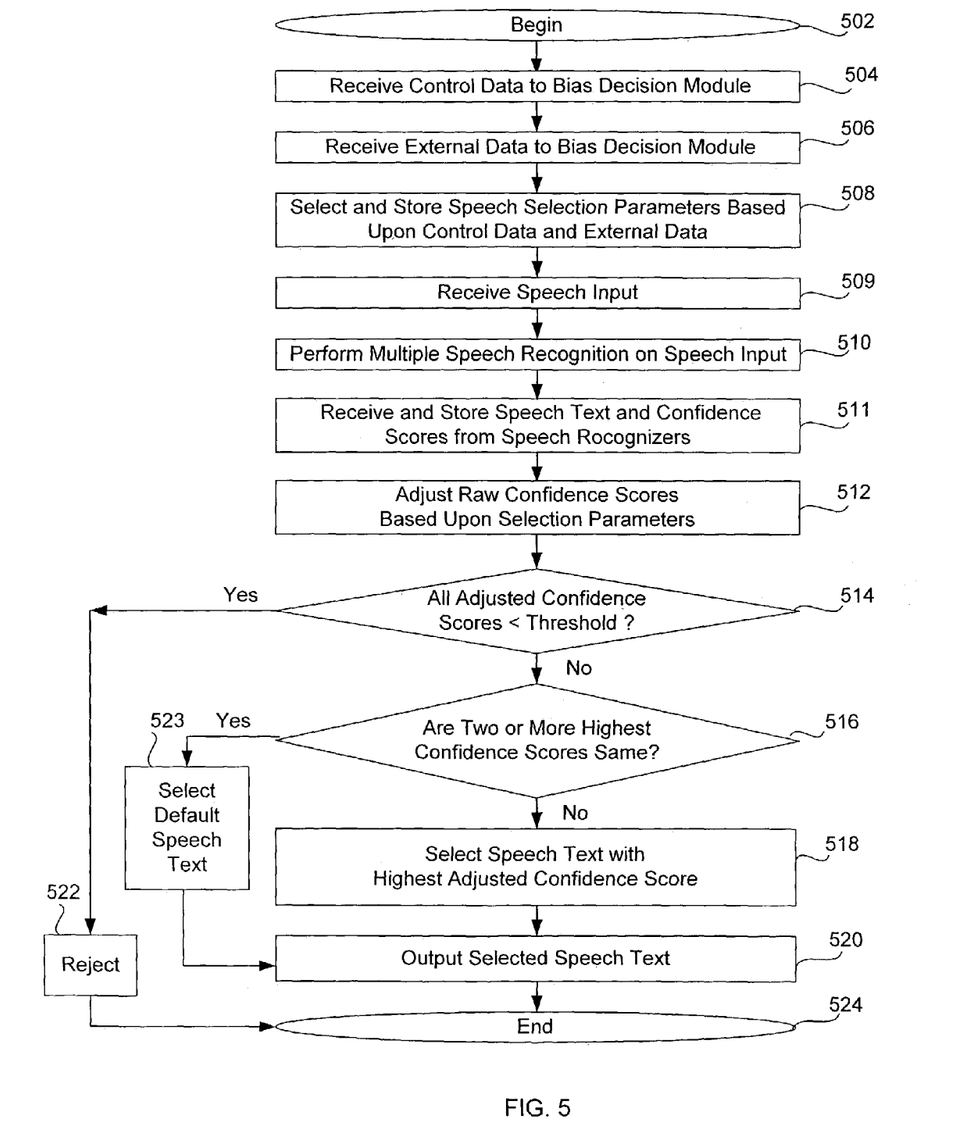
FIG. 5 is flowchart illustrating the speech recognition method using multiple speech recognizers according to a second embodiment of the present invention.

FIG. 5 is a flowchart illustrating the speech recognition method using multiple speech recognizers according to a second embodiment of the present invention. The method of FIG. 5 selects the recognized speech text with the highest adjusted confidence score as the speech recognition result. The method of FIG. 5 is also performed by the decision module 208.

Referring to FIG. 5, the method begins 502 by receiving 504 control data from the NIDI module 110 to bias the decision module 208 and by receiving 506 external data from the external input module 108 to bias the decision module 208. The method then selects and stores 508 the appropriate speech selection parameters based on the control data and the external data. Step 508 of selecting the speech selection parameters will be explained more detail below with reference to FIG. 6. In one embodiment of the present invention, the speech selection parameters are a pair of coefficients used for adjusting the raw confidence scores. The speech selection parameters will be described in more detail below with reference to FIG. 7.

The method then receives 509 a speech input and performs 510 multiple speech recognition on the speech input. The method then receives and stores 511 the recognized speech texts and associated raw confidence scores from the multiple speech recognizers. The raw confidence scores are then adjusted 512 based on the speech selection parameters to generate adjusted confidence scores. In one embodiment of the present invention, the adjusted confidence score corresponding to each of the multiple speech recognizers is calculated as follows: Adjusted Confidence Score$_n$=p$_n$×Raw Confidence Score$_n$+q$_n$, where p and q are the pair of speech selection parameters and n is the speech recognizer number. Although the adjusted confidence scores are generated as described above according to one embodiment of the present invention, it should be clear to one skilled in the art that the adjusted confidence scores may be generated in many different ways.

In step 514, if all the adjusted confidence scores are less then a predetermined threshold 514, then all the recognized speech texts are rejected 522 as being unreliable. If two or more of the highest adjusted confidence scores are the same 516, one of the recognized speech texts with the highest adjusted confidence score is selected 523 as the default result. The default result may be predetermined according to a default priority assigned to each of the multiple speech recognizers. For example, the method may select the speech text output from a particular type of speech recognizer (e.g., grammar-based speech recognizer or statistical type speech recognizer) as the default result. When all the adjusted confidence scores are not less than the threshold and two or more of the highest adjusted confidence scores are not the same, the method selects 518 the recognized speech text with the highest adjusted confidence score and outputs 520 the selected speech text as the speech recognition result, and the process ends 524.

It should be clear to one skilled in the art that the speech selection parameters may be selected such that only one of the confidence scores output from one of the speech recognizers is adjusted while leaving the other confidence scores output from the other speech recognizers unadjusted. In such case, the speech selection parameters corresponding to the unadjusted confidence scores will be (1, 0). In one embodiment, the speech selection parameters may be updated in real time whenever there is a change in the environment of the speech recognition system or periodically (every second, minute, hour, day, or the like).

Figure 6:
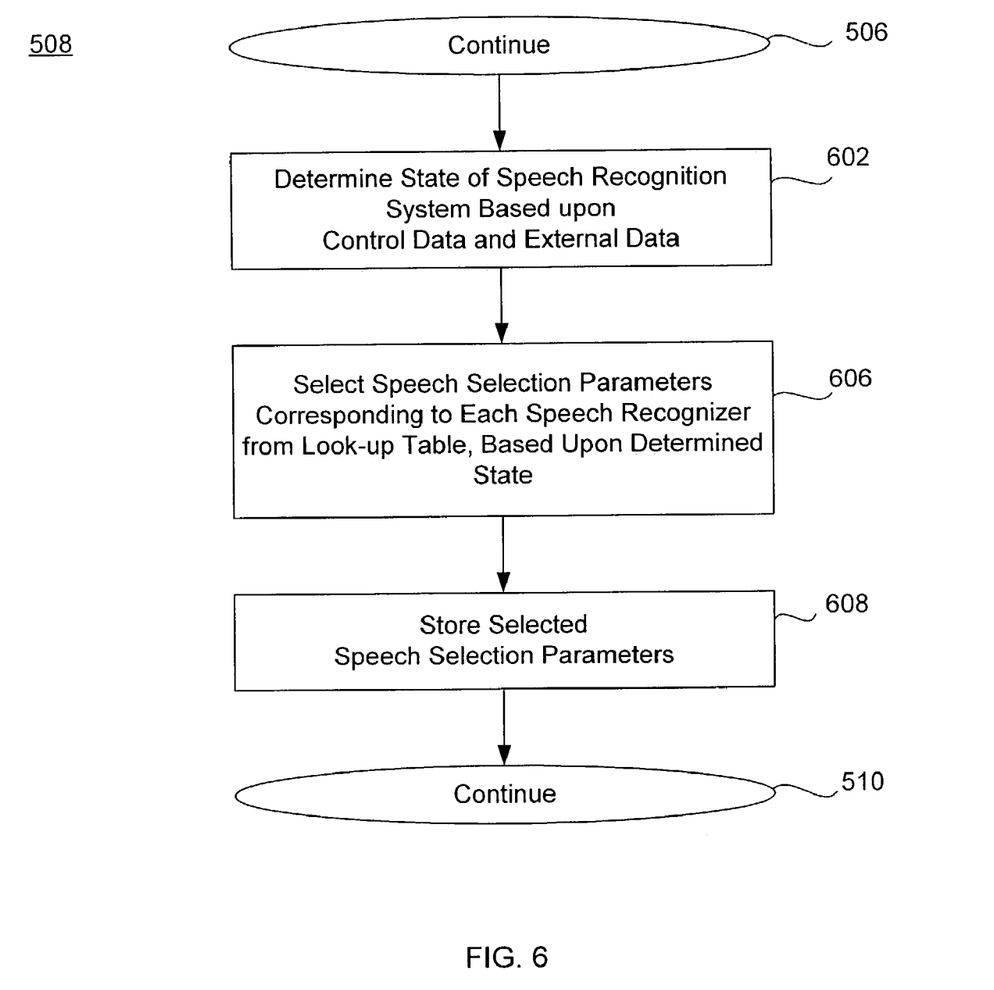
FIG. 6 is a flowchart illustrating the step of adjusting raw confidence scores output from the multiple speech recognizers.
Figure 7:
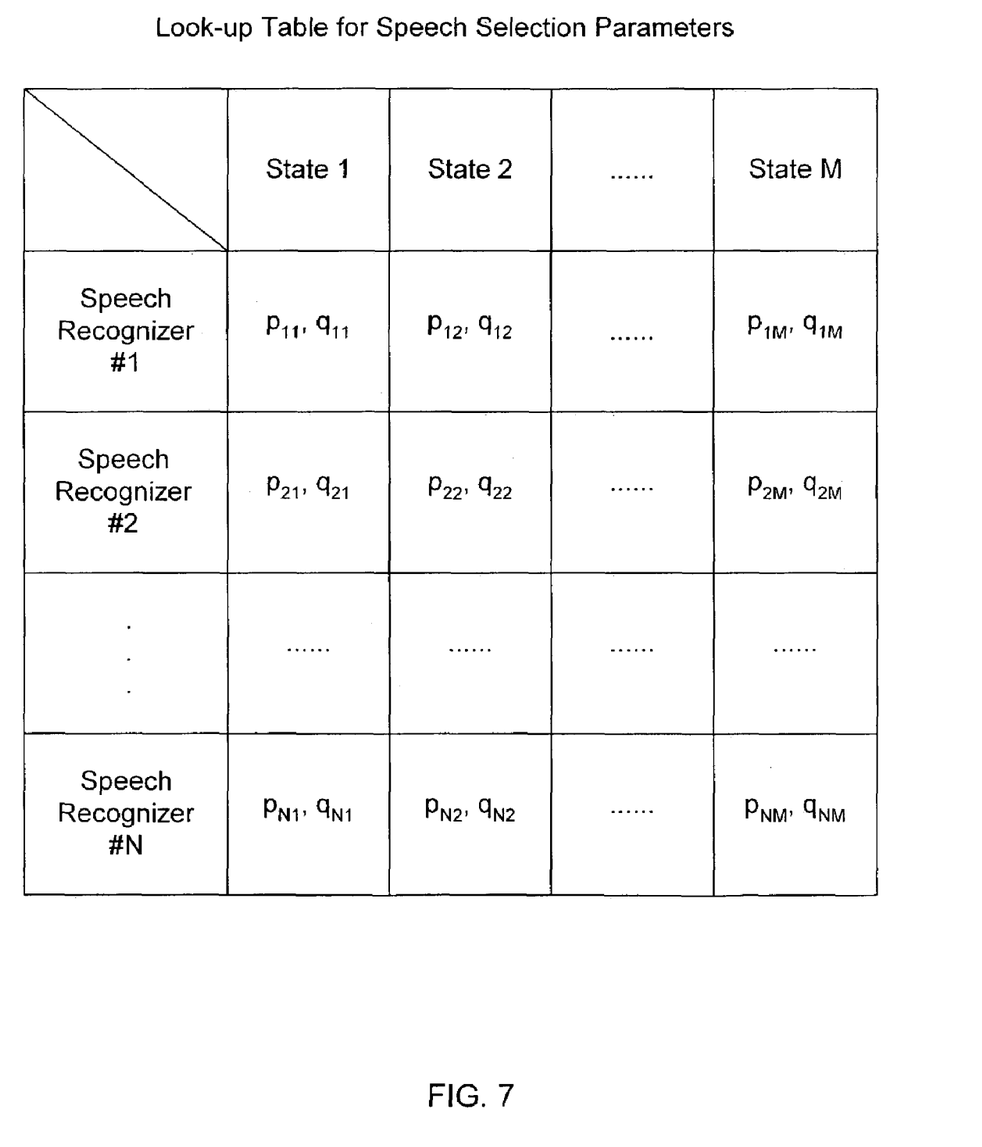
FIG. 7 is an example of a look-up table having speech selection parameters used for adjusting the raw confidence scores as shown in the flowchart of FIG. 6.

FIG. 6 is a flowchart illustrating the step 508 of adjusting the raw confidence scores output from the multiple speech recognizers, and FIG. 7 is a look-up table having the speech selection parameters (coefficients) used for adjusting the raw confidence scores. FIGS. 6 and 7 will be explained together in conjunction with each other.

Referring to FIG. 6, as the process continues 506, the method determines 602 the state of the speech recognition system based upon the control data and the external data. The states are predetermined operational states assigned according to the control data and the external data. The states may be defined by a single external data, a single control data, a combination of two or more external data, a combination of two or more control data, or a combination of two or more external data and control data. For example, State 1 may correspond to control data indicating that the context of the speech should be an address and external data indicating that the current location (GPS information) is San Francisco, Calif. State 2 may correspond to control data indicating a confirmation state that the context of the speech should be a "yes" or "no" and external data indicating that the speaker has a particular type of accent (e.g., southern accent, Italian accent, Chinese accent, Indian accent, British accent and the like) and that therefore a speech recognizer using acoustic models tailored for the particular type of accent is preferred. State 3 may correspond to control data indicating that context of the speech should be an address and external data indicating that the speaker's identity is Michael. State 4 may correspond to control data indicating that the context of the speech is a sequence of numbers and external data indicating that the background noise is at a high level. State 5 may correspond to control data indicating that the context of the speech is an address. It should be clear to one skilled in the art that the assignment of states based upon the control data and external data is not limited to the examples described above and can be modified in a number of ways as appropriate for the speech recognition system 104.

After the state of the speech recognition system is determined 602, the method selects 606 the appropriate speech selection parameters corresponding to each of the multiple speech recognizers. In one embodiment of the present invention, the method selects the speech selection parameters from a look-up table such as one shown in FIG. 7 based upon the determined state. Referring to FIG. 7, the speech selection parameters are shown assigned to their corresponding speech recognizers and operational states in the form of a look-up table. For example, the speech selection parameters (coefficients) corresponding to State M are $p_{1M}$, $q_{1M}$ for speech recognizer #1, $p_{2M}$, $q_{2M}$ for speech recognizer #2, . . . , and $p_{NM}$, $q_{NM}$ for speech recognizer #N. The selected speech selection parameters are stored 608 in the decision model 208 and the process continues to step 510. The selected speech selection parameters are used to generate the adjusted confidence scores in step 512 of FIG. 5. For example, the adjusted confidence score corresponding to speech recognizer #1 when the speech recognition system 104 is in state M will be calculated as follows: Adjusted Confidence Score=$P_{1M}$×raw confidence score+$q_{1M}$. Likewise, the adjusted confidence score corresponding to speech recognizer #N when the speech recognition system 104 is in state M will be calculated as follows: Adjusted Confidence Score=$p_{NM}$×raw confidence score+$q_{NM}$. Here, M and N are positive integers.

The speech selection parameters $p_{ij}$ (i and j are positive integers) described in FIG. 7 are real numbers and empirically determined by testing the actual speech recognizers 202, 204, 206 under the various states represented by the external data from the external input module 108 and the control data from the NIDI module 110 in order to come up with the speech selection parameters that best compare the raw confidence scores for selection of the most accurate one of the recognized speech texts. Therefore, it should be clear to one skilled in the art that the actual values of the speech selection parameters may vary depending upon the actual speech recognizers 202, 204, 206 used in the speech recognition system 104 of the present invention.

EXAMPLE 2

Consider the example of the speech recognition system of the present invention attempting to recognize the input speech "I want to go to ten University Avenue, Palo Alto" using a grammar-based speech recognizers and a statistical speech recognizer. The grammar-based speech recognizer may recognize the input speech as "10 University Avenue, Palo Cedro" with a confidence score of 65. The statistical speech recognizer may recognize the input speech as "I want to go to ten University Avenue, Palo Alto" with a confidence score of 60. The decision module may be biased by the external data, the control data, the nature of the speech recognizers, or the length of the utterance to adjust the confidence score of the statistical speech recognizer by a pair of speech selection parameters (1.1, 1) and to adjust the confidence score of the grammar-based speech recognizer by a pair of speech selection parameters (0.97, 3). In other words, the speech recognition system may be in a state in which the confidence score output from the statistical speech recognizer should be adjusted according to a pair of speech selection parameters (1.1, 1) and the confidence score output from the grammar-based speech recognizer should be adjusted according to a pair of speech selection parameters (0.97, 3). Thus, the adjusted confidence score corresponding to the statistical speech recognizer will be 67 (1.1×60+1) and the adjusted confidence score corresponding to the grammar-based speech recognizer will be 61.2 (0.97×60+3). According to the embodiment described in FIG. 5, the speech recognition system will select the speech recognition result "I want to go to ten University Avenue, Palo Alto" from the statistical speech recognizer, since its adjusted confidence score (67) is higher than the adjusted confidence score (61.2) of the grammar-based speech recognizer.

The speech recognition system according to the present invention has the advantage that it can take advantage of the strengths, while complementing the weaknesses, in two or more speech recognizers, because the output speech text is selected from the outputs of a plurality of speech recognizers. The strengths and weaknesses of each speech recognizer can be emphasized or de-emphasized by using different speech selection parameters for different states in which the speech recognition system is placed. Each state of the speech recognition system can be determined based upon the external data such as the location information of the speaker, the accent of a speaker of the input speech signal, and the identity of the speaker, or control data such as the context of the speech. Therefore, the speech recognition system can recognize input speech signals much more accurately than conventional speech recognizers and thus can be used to control back-end applications such as car navigation systems or home appliances that require very accurate speech recognition.

Although the present invention has been described above with respect to several embodiments, various modifications can be done within the scope of the present invention. For example, any number or any type of speech recognizer may be used with the speech recognition system of the present invention. Any number and type of control data and external data may be used with the speech recognition system of the present invention to define certain states in which the speech recognition system is placed. Any number of states can be assigned to the speech recognition system depending upon the types and number of the external data and control data.

Furthermore, the adjusted confidence scores may be generated in many different ways as long as they provide a meaningful comparison of the raw confidence scores adjusted according to the state of the speech recognition system. Although the method described in FIGS. 5 and 6 shows determination of a state based upon both the external data and the control data, it should be clear to one skilled in the art that the state can be defined and determined based upon only the control data or only the external data or a single type of control data or a single type of external data. In addition, although the speech recognition system of the present invention comprises a separate decision module and an NIDI module, it should be clear to one skilled in the art that the intelligence of the NIDI module may be integrated to the decision module such that all intelligence of the speech recognition system resides in the decision module. Accordingly, the disclosure of the present invention is intended to ne illustrative, but not limiting, of the scope of the invention, which is set forth in the following claims.

What is claimed is:

1. A speech recognition system for recognizing an input speech signal, the speech recognition system comprising:
a first speech recognizer recognizing the input speech signal to generate a first speech text and a first confidence score indicating a level of accuracy of the first speech text;
a second speech recognizer recognizing the input speech signal to generate a second speech text and a second confidence score indicating a level of accuracy of the second speech text;
a computerized decision module coupled to the first speech recognizer and the second speech recognizer for selecting either the first speech text or the second speech text as an output speech text, wherein
the decision module receives external data selected from a group consisting of location information of a speaker of the input speech signal, the accent of the speaker, and the identity of the speaker;
the decision module adjusts the first confidence score to generate a first adjusted confidence score based upon the external data; and
the decision module selects the first speech text if the first adjusted confidence score is higher than the second confidence score.

2. The speech recognition system of claim 1, wherein the first adjusted confidence score is generated by multiplying a first speech selection parameter with the first confidence score and adding a second speech selection parameter.

3. The speech recognition system of claim 1, wherein:
the decision module also adjusts the second confidence score to generate a second adjusted confidence score, based upon the external data; and
the decision module selects the first speech text if the first adjusted confidence score is higher than the second adjusted confidence score.

4. The speech recognition system of claim 1, further comprising a natural interaction and dialog interpretation module coupled to the decision module for receiving the output speech text and discerning the meaning of the output speech text, and wherein:

the decision module receives control data indicating the context of the input speech signal from the natural interaction and dialog interpretation module; and the decision module adjusts the first confidence score to generate the first adjusted confidence score based upon the control data.

5. The speech recognition system of claim 1, further comprising a natural interaction and dialog interpretation module coupled to the decision module for receiving the output speech text and discerning the meaning of the output speech text, and wherein:

the decision module receives control data indicating the context of the input speech signal from the natural interaction and dialog interpretation module;

the decision module adjusts the first confidence score and the second confidence score to generate the first adjusted confidence score and a second adjusted confidence score, respectively, based upon the control data; and the decision module selects the first speech text if the first adjusted confidence score is higher than the second adjusted confidence score.

6. The speech recognition system of claim 1, further comprising a natural interaction and dialog interpretation module coupled to the decision module for receiving the output speech text and discerning the meaning of the output speech text, the natural interaction and dialog interpretation module generating a control signal for controlling a back-end application coupled to the speech recognition system based upon the discerned meaning of the output speech text.

7. The speech recognition system of claim 1, wherein the first speech recognizer is a grammar-based speech recognizer and the second speech recognizer is a statistical speech recognizer.

8. The speech recognition system of claim 1, wherein the first and second confidence scores are normalized to a common range.

9. A computer-implemented method of recognizing an input speech signal to generate an output speech text, the method comprising:

recognizing the input speech signal using a first speech recognizer to generate a first speech text and a first confidence score indicating a level of accuracy of the first speech text;

recognizing the input speech signal using a second speech recognizer to generate a second speech text and a second confidence score indicating a level of accuracy of the second speech text;

receiving external data selected from a group consisting of location information of a speaker of the input speech signal, the accent of the speaker, and the identity of the speaker;

adjusting the first confidence score to generate a first adjusted confidence score based upon the external data; and selecting the first speech text as the output speech text if the first adjusted confidence score is higher than the second confidence score.

10. The method of claim 9, wherein adjusting the first confidence score comprises multiplying a first speech selection parameter with the first confidence score and adding a second speech selection parameter.

11. The method of claim 9, wherein adjusting the first confidence score comprises:

determining a state corresponding to the received external data;

selecting a first parameter and a second parameter corresponding to the determined state; and modifying the first confidence score by multiplying the first parameter with the first confidence score and adding the second parameter to generate the first adjusted confidence score.

12. The method of claim 9, further comprising:

adjusting the second confidence score to generate a second adjusted confidence score based upon the external data; and selecting the first speech text if the first adjusted confidence score is higher than the second adjusted confidence score.

13. The method of claim 9, further comprising:

receiving control data indicating the context of the input speech signal; adjusting the first confidence score to generate the first adjusted confidence score based upon the control data.

14. The method of claim 13, wherein adjusting the first confidence score comprises:

determining a state corresponding to the received control data;

selecting a first parameter and a second parameter corresponding to the determined state; and modifying the first confidence score by multiplying the first parameter with the first confidence score and adding the second parameter to generate the first adjusted confidence score.

15. The method of claim 9, further comprising:

receiving control data indicating the context of the input speech signal;

adjusting the first confidence score and the second confidence score to generate the first adjusted confidence score and a second adjusted confidence score, respectively, based upon the control data; and selecting the first speech text if the first adjusted confidence score is higher than the second adjusted confidence score.

16. The method of claim 9, wherein the first speech recognizer is a grammar-based speech recognizer and the second speech recognizer is a statistical speech recognizer.

17. The method of claim 9, further comprising rejecting both the first speech text and the second speech text as being unreliable if both the first confidence score and the second confidence score are below a threshold.

18. The method of claim 9, further comprising selecting the first speech text as a default output speech text if the first confidence score and the second confidence score are same.

19. The method of claim 9, wherein the first confidence score and the second confidence score are normalized to a common range.

20. A computerized decision module for use in a speech recognition system that recognizes an input speech signal to generate an output speech text by using a first speech recognizer and a second speech recognizer, the first speech recognizer recognizing the input speech signal to generate a first speech text and a first confidence score, and the second speech recognizer recognizing the input speech signal to generate a second speech text and a second confidence score, wherein:

the computerized decision module is coupled to the first speech recognizer and the second speech recognizer to select either the first speech text or the second speech text as the output speech text;

the decision module receives external data selected from a group consisting of location information of a speaker of the input speech signal, the accent of the speaker, and the identity of the speaker;

the decision module adjusts the first confidence score to generate a first adjusted confidence score based upon the external data; and the decision module selects the first speech text if the first adjusted confidence score is higher than the second confidence score.

21. The decision module of claim 20, wherein the first adjusted confidence score is generated by multiplying a first speech selection parameter with the first confidence score and adding a second speech selection parameter.

22. The decision module of claim 20, wherein:

the decision module also adjusts the second confidence score to generate a second adjusted confidence score, based upon the external data; and the decision module selects the first speech text if the first adjusted confidence score is higher than the second adjusted confidence score.

23. The decision module of claim 20, wherein:

the decision module is further coupled to a natural interaction and dialog interpretation module that receives the output speech text and discerns the meaning of the output speech text, the decision module receiving control data indicating the context of the input speech signal from the natural interaction and dialog interpretation module; and the decision module adjusts the first confidence score to generate the first adjusted confidence score based upon the control data.

24. The decision module of claim 20, wherein:

the decision module is further coupled to a natural interaction and dialog interpretation module that receives the output speech text and discerns the meaning of the output speech text, the decision module receiving control data indicating the context of the input speech signal from the natural interaction and dialog interpretation module;

the decision module adjusts the first confidence score and the second confidence score to generate the first adjusted confidence score and a second adjusted confidence score, respectively, based upon the control data; and the decision module selects the first speech text if the first adjusted confidence score is higher than the second adjusted confidence score.

25. The decision module of claim 20, wherein the first speech recognizer is a grammar-based speech recognizer and the second speech recognizer is a statistical speech recognizer.

26. The decision module of claim 20, wherein the first and second confidence scores are normalized to a common range.

* * * * *